United States Patent
Hou et al.

(10) Patent No.: US 9,691,272 B2
(45) Date of Patent: Jun. 27, 2017

(54) METHOD, APPARATUS AND ELECTRONIC DEVICE FOR CONTROLLING SMART HOME DEVICE

(71) Applicant: Xiaomi Inc., Beijing (CN)

(72) Inventors: Enxing Hou, Beijing (CN); Long Dai, Beijing (CN); Zhenwei Wen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/005,539

(22) Filed: Jan. 25, 2016

(65) Prior Publication Data
US 2016/0284207 A1 Sep. 29, 2016

(30) Foreign Application Priority Data
Mar. 25, 2015 (CN) .......................... 2015 1 0134554

(51) Int. Cl.
| | |
|---|---|
| G08C 17/02 | (2006.01) |
| H04L 29/08 | (2006.01) |
| G01S 11/06 | (2006.01) |
| H04L 12/28 | (2006.01) |
| H04L 29/06 | (2006.01) |
| H04W 4/00 | (2009.01) |
| H04W 4/02 | (2009.01) |

(52) U.S. Cl.
CPC .............. G08C 17/02 (2013.01); G01S 11/06 (2013.01); H04L 12/282 (2013.01); H04L 12/2803 (2013.01); H04L 63/0853 (2013.01); H04L 67/125 (2013.01); H04W 4/008 (2013.01); H04W 4/023 (2013.01); G08C 2201/60 (2013.01); G08C 2201/93 (2013.01)

(58) Field of Classification Search
CPC ...... G07C 9/00309; G07C 2009/00769; G07C 9/00111; G07C 9/00007; G07C 9/00571; G07C 2009/00793; G07C 2209/63

USPC ........................................................ 340/5.61
See application file for complete search history.

(56) References Cited

U.S. PATENT DOCUMENTS

| | | |
|---|---|---|
| 8,625,796 B1 | 1/2014 | Ben Ayed |
| 9,525,796 B2 | 12/2016 | Nakahara |
| 2014/0027645 A1 | 1/2014 | Filson et al. |
| 2014/0179276 A1 | 6/2014 | Kang et al. |
| 2014/0282967 A1 | 9/2014 | Maguire et al. |

(Continued)

FOREIGN PATENT DOCUMENTS

| | | |
|---|---|---|
| CN | 103684512 A | 3/2014 |
| CN | 103824012 A | 5/2014 |

(Continued)

OTHER PUBLICATIONS

International Search Report dated Feb. 6, 2016 for International Application No. PCT/CN2015/093218, 5 pages.

(Continued)

*Primary Examiner* — Mark Blouin
(74) *Attorney, Agent, or Firm* — Brinks, Gilson & Lione

(57) ABSTRACT

A method, an apparatus, and an electronic device are provided for controlling a smart home device. In the method, the device detects a user trigger operation from a user, where the user trigger operation indicates a request for a control permission to control the smart home device. The device determines whether a wearable device associated with the user is located within a preset distance range. When determining that the wearable device is located within the preset distance range, the device grants the user the control permission.

20 Claims, 6 Drawing Sheets

(56) References Cited

U.S. PATENT DOCUMENTS

| | | | |
|---|---|---|---|
| 2014/0313867 A1 | 10/2014 | Lee et al. | |
| 2014/0368336 A1* | 12/2014 | Felix | H04W 4/008 340/539.13 |
| 2015/0031347 A1* | 1/2015 | Kim | H04M 1/0245 455/418 |
| 2015/0077224 A1 | 3/2015 | Pal | |
| 2015/0349852 A1* | 12/2015 | Choi | H04M 1/72519 455/41.1 |
| 2016/0065666 A1* | 3/2016 | Kim | H04L 67/1051 709/203 |
| 2016/0066123 A1* | 3/2016 | Ko | H04W 4/005 455/41.1 |
| 2016/0110056 A1* | 4/2016 | Hong | G06F 3/04812 715/768 |
| 2016/0343237 A1* | 11/2016 | Herman | G08B 25/008 |

FOREIGN PATENT DOCUMENTS

| | | |
|---|---|---|
| CN | 103926890 A | 7/2014 |
| CN | 104155897 A | 11/2014 |
| CN | 104317393 A | 1/2015 |
| CN | 104318732 A | 1/2015 |
| CN | 104375497 A | 2/2015 |
| CN | 104714414 A | 6/2015 |
| KR | 10-2012-0126821 A | 11/2012 |
| KR | 10-1425595 B1 | 8/2014 |

OTHER PUBLICATIONS

English Translation of International Search Report dated Feb. 6, 2016 for International Application No. PCT/CN2015/093218, 4 pages.

Examination Report dated Mar. 6, 2017 for European Application No. 16152635.5, 9 pages.

Extended European Search Report dated Jul. 28, 2016 for European Application No. 16152635.5, 9 pages.

Office Action dated Nov. 28, 2016 for Chinese Application No. 201510134554.5, 23 pages.

Office Action dated Oct. 14, 2016 for Korean Application No. 10-2015-7036863, 5 pages.

* cited by examiner

METHOD, APPARATUS AND ELECTRONIC DEVICE FOR CONTROLLING SMART HOME DEVICE

CROSS-REFERENCE TO RELATED APPLICATIONS

The present application is based upon and claims priority to Chinese Patent Application No. 201510134554.5, filed Mar. 25, 2015, the entire contents of which are incorporated herein by reference.

TECHNICAL FIELD

The present disclosure generally relates to the technical field of smart homes, and more particularly, to a method, an apparatus and an electronic device for controlling a smart home device.

BACKGROUND

Smart Home (or Home Automation) is based on a platform of a residence, utilizing integrated wiring technology, network communication technology, security technology, automatic control technology, audio and video technology, etc., to construct a high efficient system for managing residential facilities and household daily affairs, thereby to improve safety, convenience, comfort, artistry of a household life, and to achieve an eco-friendly living environment.

According to design and concept of a smart home, a user can perform remote control of a smart home device through a terminal in any time and at any place.

SUMMARY

According to a first aspect of the present disclosure, a method is provided for controlling a smart home device. The method may be implemented by a device. In the method, the device detects a user trigger operation from a user, where the user trigger operation indicates a request for a control permission to control the smart home device. The device determines whether a wearable device associated with the user is located within a preset distance range of the device. When determining that the wearable device is located within the preset distance range, the device grants the user the control permission.

According to a second aspect of the present disclosure, there is provided an electronic device, including: a processor and a memory for storing instructions executable by the processor. The processor is configured to perform acts including: detecting a user trigger operation from a user, where the user trigger operation indicates a request for a control permission to control the smart home device; determining whether a wearable device associated with the user is located within a preset distance range of the electronic device; and granting the user the control permission when determining that the wearable device is located within the preset distance range.

According to a third aspect of the present disclosure, there is provided a non-transitory computer-readable storage medium storing instructions that, when being executed by a processor of a terminal, cause the terminal to perform acts including: detecting a user trigger operation from a user, where the user trigger operation indicates a request for a control permission to control the smart home device; determining whether an associated wearable device is located within a preset distance range of the terminal; and granting the user the control permission, when determining that the wearable device is located within the preset distance range.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
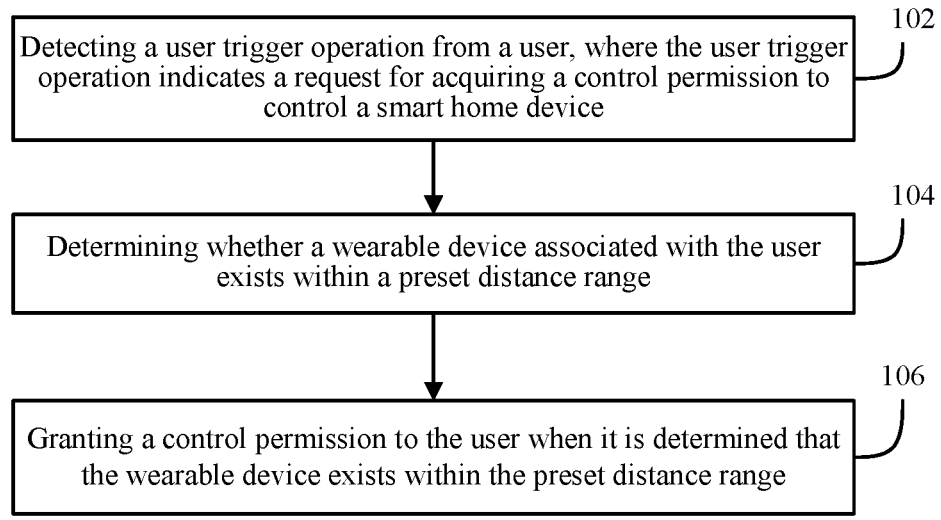
FIG. 1 is a flow chart showing a method for controlling a smart home device according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The technical scheme according to embodiments of the present disclosure may have the following beneficial effects. By managing the control permission with respect to a smart home device, the disclosed method improves security of the smart home device. In addition, the device may grant the user a control permission by detecting a wearable device associated with the user in a preset distance, the user operation is simplified and the user experience is improved without using a password. The wearable device associated with the user may be referred as an associated device in the disclosure.

FIG. 1 is a flow chart of a method for controlling a smart home device according to an exemplary embodiment. Referring to FIG. 1, the method is applied in a terminal, and may include the following steps. The terminal may include: a smart phone, a laptop, a tablet, or other electronic device including a hardware processor and a communication circuitry configured to communicate with a wearable device.

In step 102, a terminal detects a user trigger operation from a user, where the user trigger operation indicates a request for acquiring a control permission to control a smart home device.

Figure 2:
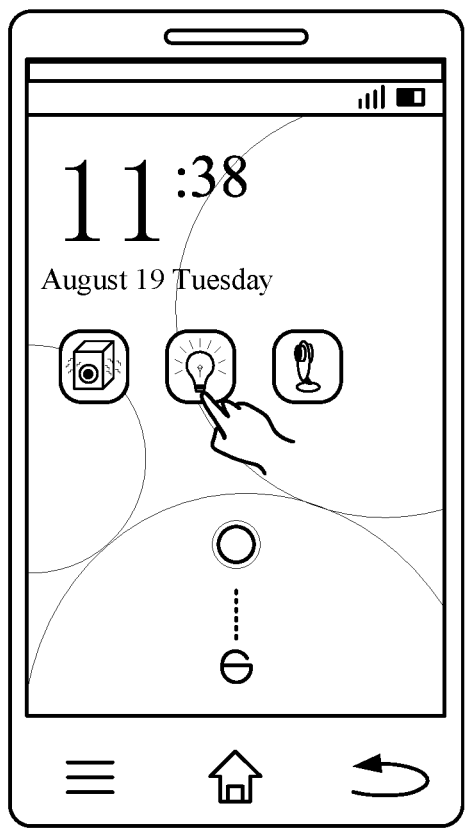
FIGS. 2-3 are schematic diagrams illustrating a locked screen of a terminal according to an exemplary embodiment.

In the embodiments, the user trigger operation may include a touch operation with respect to a screen of the terminal, and a touch point of the touch operation is located within a trigger range of a displayed icon of the smart home device. For example, FIG. 2 is a schematic diagram of a locked screen of the terminal. Assuming that the user has configured a terminal with a function to control a smart home device, a displayed icon as shown in FIG. 2 may be presented on a locked screen of the terminal, and the user can perform control of the corresponding smart home device through a touch operation on the displayed icon.

For example, three displayed icons are shown in FIG. 2, respectively for user-configured control of "Smart Speaker", "Smart Lamp" and "Smart Camera." In this case, when the user performs a touch operation on a displayed icon of "Smart Lamp" (assuming that the trigger range of the displayed icon is the displaying range of the icon), and when the touch point overlaps with at least part of the displayed icon, it may be determined that the user has triggered the displayed icon.

Figure 3:
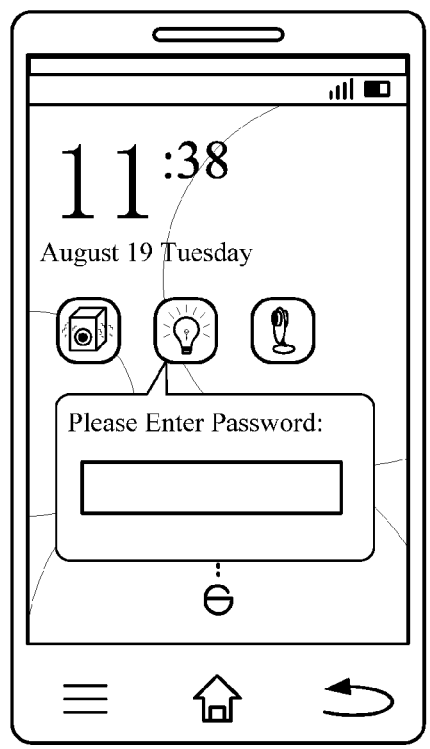
Figure 4:
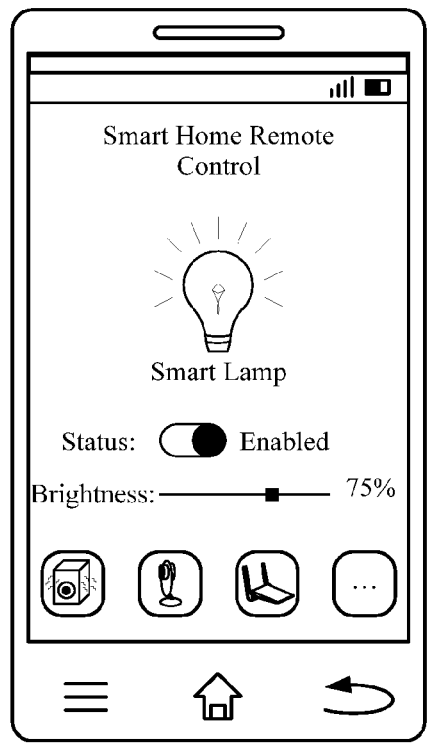
FIG. 4 is a schematic diagram illustrating a control interface of a smart home device according to an exemplary embodiment.

When the touch operation on the displayed icon by the user is detected, there may be two ways for the user to receive a control permission to the underlying smart device. According to a first method, the terminal may display a password inputting interface on the locked screen, as shown in FIG. 3. In the first method, the user can enter a control interface of smart home devices as shown in FIG. 4 to perform controlling an operation on a smart home device only after he inputs a password that matches a preset password on the password inputting interface. In this method, the terminal is required to switch interface, and the user is required to manually complete a password inputting operation, therefore, the method has a complex procedure which influences the user experience, which may not desirable when the user needs to handle an emergency. In this regard, the present disclosure provides a second method including the following steps.

In step 104, the terminal determines whether a wearable device associated with the user exists within a preset distance range. The terminal may determine that the wearable device exists when the wearable device is located within the preset range of the terminal.

In step 106, the terminal grants a control permission to the user when it is determined that the wearable device is located within the preset distance range of the terminal. The user may then directly control the smart home device using the terminal and/or the wearable device.

1. Application Situation

In the present disclosure, as for a user performing a trigger operation, the terminal actually intends to acquire identity information of the user. If he is a user having a management permission, the user is permitted to control the smart home device, otherwise his control operation request will be denied. Thus, since the wearable device is a smart device (such as a smart bracelet, smart glasses, a smart ring and the like) worn by a user, when the user triggers the displayed icon on the screen of the terminal, the user and the wearable device and the terminal are very close to one another, the proximity information is used to distinguish a user performing the control and other users.

Figure 5:
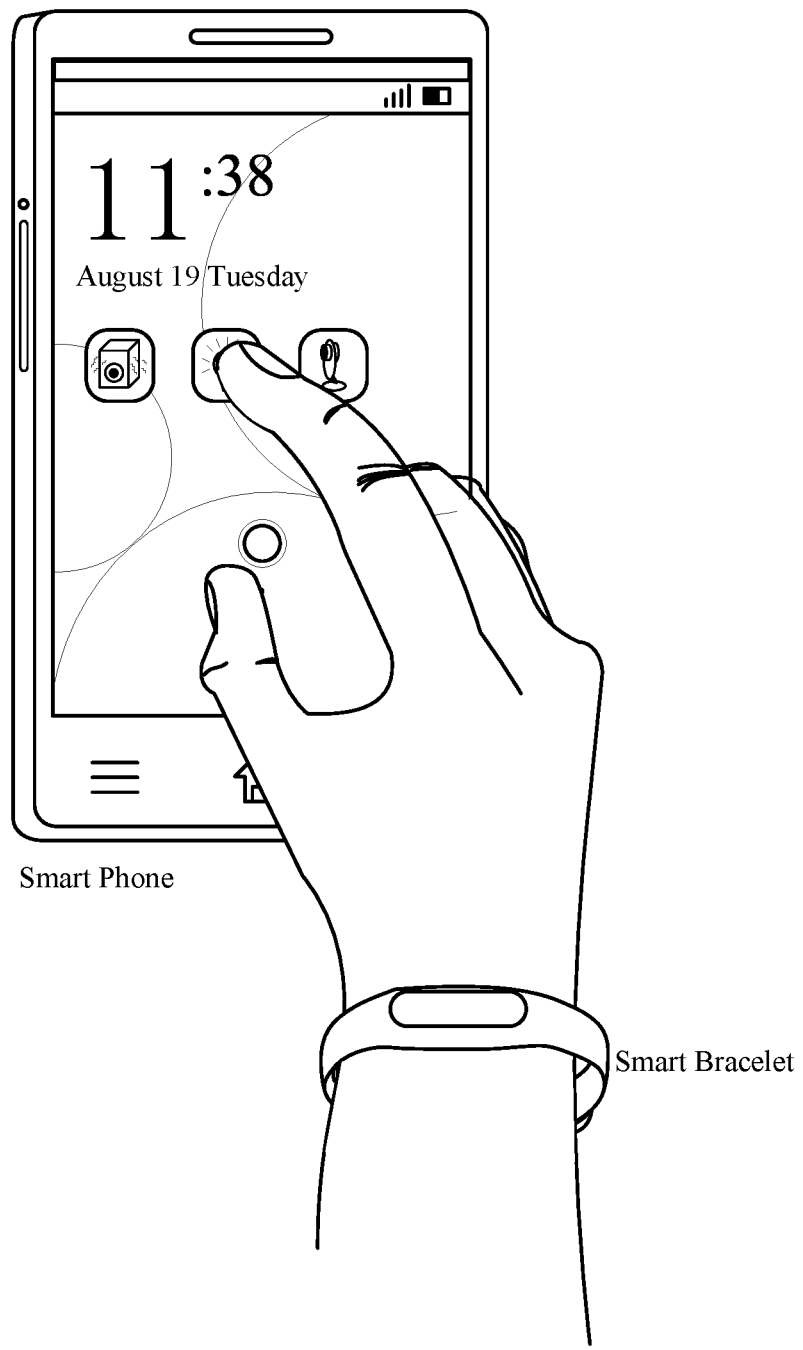
FIG. 5 is a schematic diagram illustrating a control interface for starting a smart home device according to an exemplary embodiment.

As shown in FIG. 5, assuming that the terminal is a smart phone and the wearable device is a smart bracelet worn by the user on his wrist, when the user touches (here, touching is merely an example, apparently, other forms of operation can also be performed, such as a swipe operation and the like, which is not limited in the present disclosure) a displayed icon on the locked screen of the terminal with his finger, and if the smart phone detects that the smart bracelet is within a preset distance range and the smart bracelet is a wearable device associated with the smart phone, the smart phone may be determined that the user currently performing control has a management permission, and then a control permission with respect to the smart home device is granted, for example, by directly turning to a control operation interface as shown in FIG. 4.

2. Preset Distance Range

Figure 6:
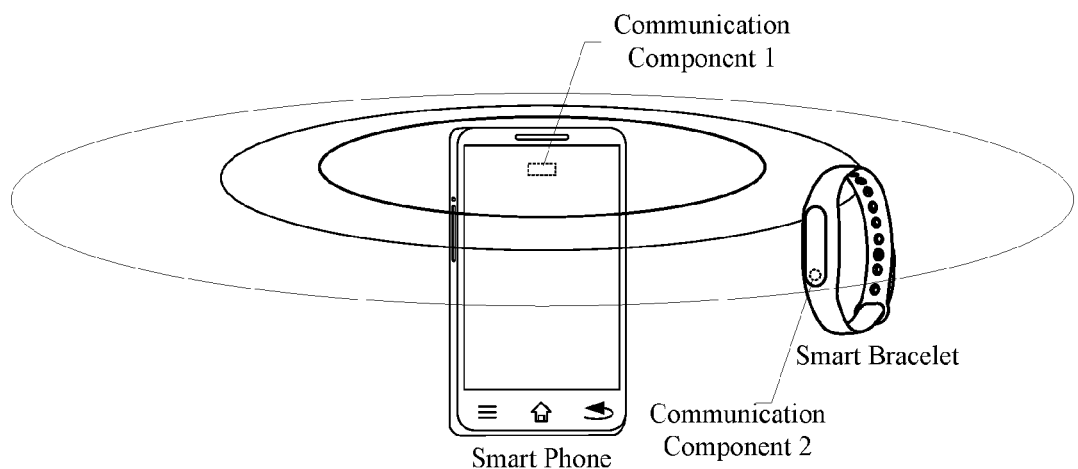
FIG. 6 is a schematic diagram illustrating scanning a wearable device according to an exemplary embodiment.

Still referring to the "smart phone—smart bracelet" example as shown in FIG. 5, as shown in FIG. 6, assuming that the smart phone is equipped with a communication component 1 and the smart bracelet is equipped with a communication component 2, as an exemplary embodiment, the communication component 1 and the communication component 2 may be Blue Tooth communication components. When the smart phone detects a trigger operation by the user on a displayed icon on the locked screen, a probe signal is emitted out through the communication component 1. Correspondingly, the smart phone can recognize a real-time distance of the smart bracelet by various manners, two of which are described as follows.

1) Setting Emitting Parameter

When the communication component 1 emits a probe signal, an emitting parameter of the probe signal is set to correspond to the preset distance range. For example, the emitting parameter may be an emitting power (or a signal strength) which positively correlates to the preset distance range, and the larger the emitting power (or the signal strength) is, the larger the corresponding preset distance range is.

Thus, if the smart bracelet is within the preset distance range of the smart phone, the communication component 2 can receive the signal emitted by the communication component 1, and return a corresponding response signal.

2) Sensing Signal Strength

After it emits a probe signal, the communication component 1 receives a response signal returned by smart bracelet through the communication component 2. Then, the communication component 1 detects the strength of the received response signal, based on which the smart phone determines a real-time distance between the smart phone and the smart bracelet. The detected signal strength negatively correlates to the real-time distance, that is, the signal strength decreases when the corresponding real-time distance increases.

Thus, if the smart bracelet is within the preset distance range of the smart phone, when the communication component 1 receives the response signal emitted by the communication component 2, the strength of the response signal should be within a preset range.

However, the above manners of 1) Setting Emitting Parameter and 2) Sensing Signal Strength may be combined to determine the real-time distance between the smart phone and the smart bracelet, which will not be repeated herein.

3. Associated Wearable Device

As an exemplary embodiment, after it emits a probe signal, the terminal may determine whether an associated wearable device is located within the preset distance range according to whether it receives a corresponding response signal. When the terminal receives a corresponding response signal, a sending party of the response signal is determined as an associated wearable device. Here, the probe signal may be under a communication protocol dedicated to wearable devices, to avoid misjudgment due to scanning a device other than a wearable device. Here, the associated wearable device may include wearable device paired with the terminal using one or more communication standard including: Bluetooth technology, optical communication, or other wireless technology.

As another exemplary embodiment, when the terminal receives a corresponding response signal, it determines whether a strength of the response signal is within a preset range. When the strength of the response signal is within the preset range, the terminal determines a sending party of the response signal as an associated wearable device.

As still another exemplary embodiment, when the terminal receives a corresponding response signal, the terminal can determine whether a sending party of the response signal is an associated wearable device according to whether the response signal contains a preset device ID. When the response signal contains the preset device ID, the terminal determines the sending party of the response signal as an associated wearable device.

In the embodiments, the terminal and the wearable device may be previously associated, and the terminal can register the device ID of the associated wearable device. Thus, still referring to the situation as shown in FIG. 5 as an example, if the communication component 1 of the smart phone receives a response message returned by the smart bracelet through the communication component 2, and the response signal contains a preset device ID which has been registered in the smart phone, this means that the smart phone and the smart bracelet are previously associated, and then a control permission may be granted to the corresponding user. By verifying a device ID, it can further avoid that a user performs fraud with a false identity to the terminal with a wearable device that has not been associated, and it can further improve security.

In this disclosure, the terminal may select any one of the above embodiments or any combination of them, to recognize the associated wearable device, which is not repeated herein.

4. Granting Control Permission

On one hand, a control permission can have a controllable object limit. For example, it is granted only a control permission with respect to a smart home device corresponding to a displayed icon which is triggered. For example, in a control interface as shown in FIG. 4, since he triggers a displayed icon corresponding to the smart lamp as shown in FIG. 2, the user may control the smart lamp (such as switch the "Status", adjust "Brightness" and the like) in the control interface as shown in FIG. 4. When the user clicks other smart home devices shown in the lower part of FIG. 4, user identity is required to be verified again, so as to further improve the security.

However, the controllable object limit is not necessary. For example, if it does not have such a limit, when the user clicks a displayed icon in the lower part of FIG. 4, it can switch to a control interface of the corresponding smart home device, for the user to perform a control operation.

On the other hand, the control permission can have a control time limit. For example, only before a current control operation finishes, a control permission with respect to a smart home device is granted. Here, "a current control operation finishes" may be interpreted as any one of the following forms: after he enters a control interface as shown in FIG. 4 through a trigger operation as shown in FIG. 2, the user exits from the control interface as shown in FIG. 4; the screen of the terminal is locked; a preset time period has elapsed since the displayed icon is triggered, or the like.

However, after he triggers a smart home device on the interface of the terminal as shown in FIG. 2, the user does not necessarily enter the control interface as shown in FIG. 4. For example, after the user triggers the "Smart Lamp" as shown in FIG. 2, the terminal may directly send a "switch on" controlling command to the smart lamp. Then, the user may also enter the control interface as shown in FIG. 4 by other means, so as to perform other control operations.

Corresponding to the above embodiment of the method for controlling a smart home device, the present disclosure also provides embodiments of an apparatus for controlling a smart home device.

Figure 7:
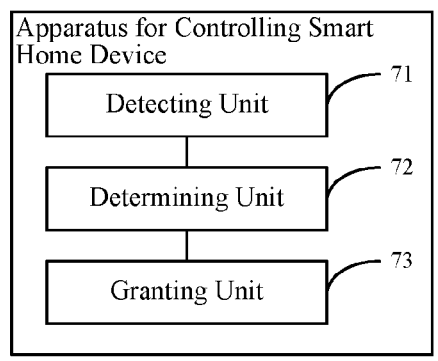
FIGS. 7-12 are block diagrams illustrating apparatuses for controlling a smart home device according to an exemplary embodiment.

FIG. 7 is a block diagram illustrating an apparatus for controlling a smart home device according to an exemplary embodiment. As shown in FIG. 7, the apparatus may include: a detecting unit 71, a determining unit 72 and a granting unit 73.

Here, the detecting unit 71 is configured to detect a user trigger operation which is for acquiring a control permission with respect to the smart home device. The determining unit 72 is configured to determine whether an associated wearable device is located within a preset distance range. The granting unit 73 is configured to grant a control permission with respect to the smart home device, when it is determined that an associated wearable device is located within a preset distance range.

Optionally, the user trigger operation is a touch operation or a swipe operation with respect to a screen of a terminal by a user, a touch point of the touch operation or the swipe operation is within a trigger range of an icon corresponding to the smart home device. The icon may correspond to a mobile application installed on the terminal.

Optionally, the user trigger operation is a touch operation or a swipe operation with respect to a locked screen of a terminal by a user, a touch point of the touch operation or the swipe operation is within a trigger range of a displayed icon corresponding to the smart home device.

Figure 8:
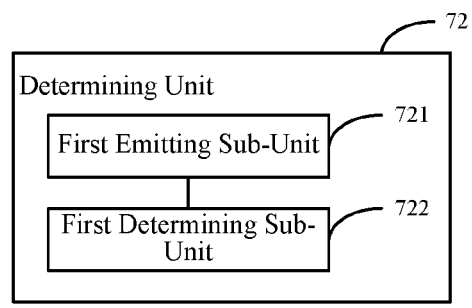

FIG. 8 is a block diagram illustrating another apparatus for controlling a smart home device according to an exemplary embodiment based on the embodiment as shown in FIG. 7. As shown in FIG. 8, the determining unit 72 may include: a first emitting sub-unit 721 and a first determining sub-unit 722.

Here, the first emitting sub-unit 721 is configured to emit a probe signal, an emitting parameter of the probe signal corresponding to the preset distance range. The first determining sub-unit 722 is configured to determine whether an associated wearable device is located within the preset distance range according to whether a corresponding response signal is received; and when a corresponding response signal is received, determine a sending party of the response signal as an associated wearable device.

Figure 9:
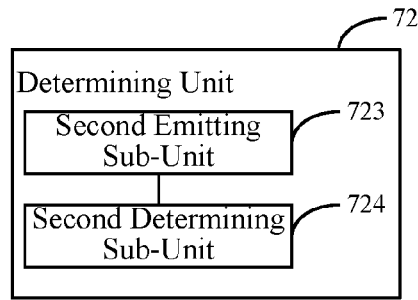

FIG. 9 is a block diagram illustrating another apparatus for controlling a smart home device according to an exemplary embodiment based on the embodiment as shown in FIG. 7. As shown in FIG. 9, the determining unit 72 may include: a second emitting sub-unit 723 and a second determining sub-unit 724.

The second emitting sub-unit 723 is configured to emit a probe signal. The second determining sub-unit 724 is configured to, when a corresponding response signal is received, determine whether a strength of the response signal is within a preset range; and when the strength of the response signal is within the preset range, determine a sending party of the response signal as an associated wearable device.

Figure 10:
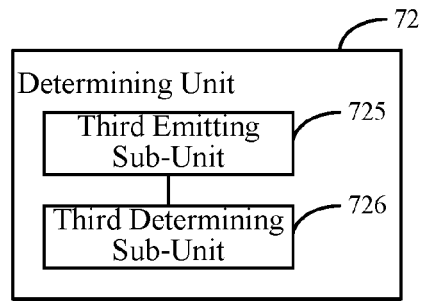

FIG. 10 is a block diagram illustrating another apparatus for controlling a smart home device according to an exemplary embodiment based on the embodiment as shown in FIG. 7. As shown in FIG. 10, the determining unit 72 may include: a third emitting sub-unit 725 and a third determining sub-unit 726.

Here, the third emitting sub-unit 725 is configured to emit a probe signal, an emitting parameter of the probe signal corresponding to the preset distance range. The third determining sub-unit 726 is configured to, when a corresponding response signal is received, determine whether a sending party of the response signal is an associated wearable device according to whether the response signal contains a preset device ID; and when the response signal contains the preset device ID, determine the sending party of the response signal as an associated wearable device.

It should be noted that, the permission granting sub-unit 731 in the apparatus according to the embodiment as shown in FIG. 10 can also be included in the apparatus according to the embodiment as shown in FIG. 9, which is not limited in the present disclosure.

Figure 11:
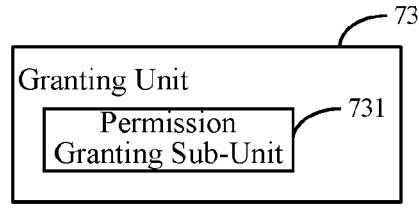

FIG. 11 is a block diagram illustrating another apparatus for controlling a smart home device according to an exemplary embodiment based on the embodiment as shown in FIG. 7. As shown in FIG. 11, the granting unit 73 may include a permission granting sub-unit 731.

The permission granting sub-unit 731 is configured to, before a current control operation finishes, grant a control permission with respect to the smart home device.

It should be noted that, the permission granting sub-unit 731 in the apparatus according to the embodiment as shown in FIG. 11 can also be included in the apparatus according to the embodiments as shown in the above FIGS. 9-10, which is not limited in the present disclosure.

Figure 12:
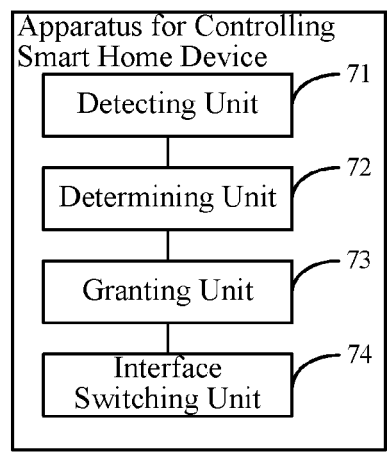

FIG. 12 is a block diagram illustrating another apparatus for controlling a smart home device according to an exemplary embodiment based on the embodiment as shown in FIG. 7. As shown in FIG. 12, the apparatus may further include: an interface switching unit 74.

Here, the interface switching unit 74 is configured to, after a control permission with respect to the smart home device is granted, switch to a control operation interface of the smart home device.

It should be noted that, the interface switching unit 74 in the apparatus according to the embodiment as shown in FIG. 12 can also be included in the apparatus according to the embodiments as shown in the above FIGS. 8-11, which is not limited in the present disclosure.

With respect to the apparatuses in the above embodiments, the specific manners for performing operations for individual modules therein have been described in detail in the embodiments regarding the relevant methods, which will not be elaborated herein.

For the embodiments regarding apparatuses, since they correspond to the embodiments regarding methods, they may be referred to the description of the method embodiments regarding methods. The embodiments regarding apparatuses described above are merely illustrative. The units described as separate components may be or may not be physically separate, and the components illustrated as a units may be or may not be physical units, and may be at the same location, or may be distributed to multiple units over the network. A part of or the whole of the modules may be selected to achieve the objective of the present disclosure as desired. One skilled in the art can understand and practice the embodiments without paying any creative labor.

Correspondingly, the present disclosure also provides a device for controlling a smart home device, including: a processor; and a memory for storing instructions executable by the processor; where the processor is configured to perform: detecting a user trigger operation which is for acquiring a control permission with respect to the smart home device; determining whether an associated wearable device is located within a preset distance range; and granting a control permission with respect to the smart home device, when determining that an associated wearable device is located within a preset distance range.

Correspondingly, the present disclosure also provides a terminal, including a memory, and one or more programs. The one or more programs are stored in the memory, and one or more processors are configured to execute the one or more programs that contain instructions to cause the one or more processors to perform: detecting a user trigger operation which is for acquiring a control permission with respect to the smart home device; determining whether an associated wearable device is located within a preset distance range; and granting a control permission with respect to the smart home device, when determining that an associated wearable device is located within a preset distance range.

Figure 13:
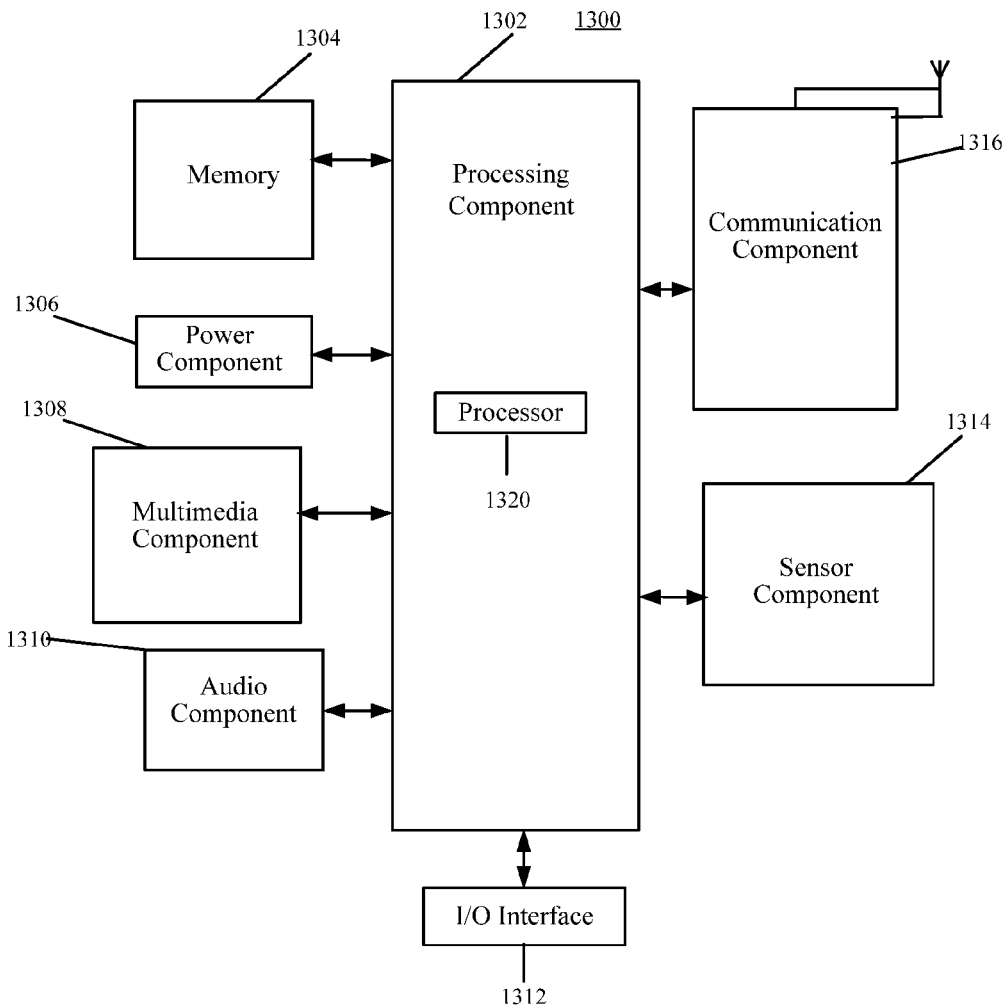
FIG. 13 is a block diagram of a device configured to control a smart home device according to an exemplary embodiment.

FIG. 13 is a block diagram of a device 1300 for controlling a smart home device according to an exemplary embodiment. For example, the device 1300 may be a mobile phone, a computer, a digital broadcast terminal, a messaging device, a gaming console, a tablet, a medical device, exercise equipment, a personal digital assistant, and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G; or 3G or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more processing circuitry including: application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. The modules and units in the disclosure may be implemented using the one or more processing circuitry. Each module may take the form of a packaged functional hardware unit designed for use with other components, a portion of a program code (e.g., software or firmware) executable by the processor 1320 or the processing circuitry that usually performs a particular function of related functions, or a self-contained hardware or software component that interfaces with a larger system, for example.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

What is claimed is:

1. A method for controlling a smart home device, comprising:
   displaying, by a mobile terminal including a processor, an interface to control the smart home device, the mobile terminal requiring a control permission to control the smart home device via the interface;
   detecting, by the mobile terminal, a user trigger operation comprising a touch input within a trigger range of the interface;
   determining, by the mobile terminal and in response to the user trigger operation, that a wearable device associated with the mobile terminal is located within a preset distance range of the mobile terminal; and
   granting, by the mobile terminal, the control permission in response to the determining that the wearable device is located within the preset distance range.

2. The method of claim 1, wherein the user trigger operation comprises a touch operation or a swipe operation with respect to a screen of the mobile terminal, a touch point of the touch operation or the swipe operation is within the trigger range of a displayed icon corresponding to the smart home device.

3. The method of claim 1, wherein the user trigger operation comprises a touch operation or a swipe operation with respect to a locked screen of the mobile terminal, a touch point of the touch operation or the swipe operation is within the trigger range of a displayed icon corresponding to the smart home device.

4. The method of claim 1, wherein determining that the wearable device is located within the preset distance range comprises:
   emitting a probe signal according to an emitting parameter corresponding to the preset distance range;
   receiving a response signal; and
   determining the response signal corresponds to the wearable device based on a sending party identified by the response signal received from wearable device.

5. The method of claim 1, wherein determining that the wearable device is located within a preset distance range comprises:
   emitting a probe signal;
   in response to receiving a response signal, determining whether a strength of the response signal is indicative of the wearable device being within a preset range; and
   in response to the strength of the response signal being within the preset range, determining a sending party of the response signal as the wearable device.

6. The method of claim 1, wherein determining that the wearable device is located within a preset distance range comprises:
   emitting a probe signal according to an emitting parameter, the emitting parameter corresponding to the preset distance range;
   in response to receiving a response signal, determining whether a sending party of the response signal is the wearable device according to whether the response signal indicates a preset device ID; and
   in response to the response signal indicating the preset device ID, determining the sending party of the response signal as the wearable device.

7. The method of claim 1, wherein granting a control permission with respect to the smart home device comprises:
   revoking the control permission in response to detection of at least one of a preset time period elapsing, a screen of the mobile terminal locking, or an exiting of the interface.

8. The method of claim 1, wherein the method further comprises:
   after granting a control permission with respect to the smart home device, displaying a control operation interface of the smart home device, the control operation interface comprising an icon triggerable to control the smart home device by the mobile terminal.

9. An electronic device, comprising:
   a processor; and
   a memory for storing instructions executable by the processor; wherein the processor is configured to perform:
   detecting a user trigger operation from a user, the user trigger operation indicating a request for a control permission to control a smart home device;
   determining whether a wearable device associated with the user is located within a preset distance range of the electronic device; and
   granting the user the control permission when determining the wearable device is located within the preset distance range.

10. The electronic device of claim 9, wherein the user trigger operation is a touch operation or a swipe operation with respect to a screen of the electronic device by the user, a touch point of the touch operation or the swipe operation is within a trigger range of a displayed icon corresponding to the smart home device.

11. The electronic device of claim 9, wherein the user trigger operation is a touch operation or a swipe operation with respect to a locked screen of the electronic device by a user, a touch point of the touch operation or the swipe operation is within a trigger range of a displayed icon corresponding to the smart home device.

12. The electronic device of claim 9, wherein determining whether the wearable device is located within a preset distance range comprises:
   emitting a probe signal, an emitting parameter of the probe signal corresponding to the preset distance range;
   determining whether the wearable device is located within the preset distance range by receiving a response signal; and determining a sending party of the response signal as the wearable device.

13. The electronic device of claim 9, wherein determining whether the wearable device is located within a preset distance range comprises:
   emitting a probe signal;
   when receiving a corresponding response signal, determining whether a strength of the response signal is indicative of the wearable device being within a preset range; and
   when the strength of the response signal is within the preset range, determining a sending party of the response signal as the wearable device.

14. The electronic device of claim 9, wherein determining whether the wearable device is located within a preset distance range comprises:
   emitting a probe signal, an emitting parameter of the probe signal corresponding to the preset distance range;

when receiving a corresponding response signal, determining whether a sending party of the response signal is the wearable device according to whether the response signal contains a preset device ID; and when the response signal contains the preset device ID, determining the sending party of the response signal as the wearable device.

15. The electronic device of claim 9, wherein granting a control permission with respect to the smart home device comprises:
before a current control operation finishes, granting a control permission with respect to the smart home device.

16. The electronic device of claim 9, wherein the processor is further configured to perform: after granting a control permission with respect to the smart home device, switching to a control operation interface of the smart home device.

17. A non-transitory computer-readable storage medium storing instructions that, when being executed by a processor of a terminal, cause the terminal to perform:
displaying, on a screen of a terminal, an interface to control a smart home device, wherein the terminal requires a control permission to control the smart home device with the interface;
determining that a wearable device associated with the terminal is located within a preset distance range of the terminal and
granting the control permission in response to determining that the wearable device is located within the preset distance range of the terminal.

18. The non-transitory computer-readable storage medium of claim 17, wherein determining that the wearable device is located within the preset distance range comprises:
emitting a probe signal according to an emitting parameter of the probe signal, the emitting parameter of the probe signal corresponding to the preset distance range; and
in response to receipt of a response signal:
determining that the wearable device is located within the preset distance range based on an emitting parameter of the response signal; and
determining a sending party of the response signal as the wearable device.

19. The non-transitory computer-readable storage medium of claim 17, wherein determining that the wearable device is located within the preset distance range comprises:
emitting a probe signal;
in response to receiving a response signal, determining whether a strength of the response signal is indicative of the wearable device being within a preset range; and
in response to the strength of the response signal being within the preset range, determining a sending party of the response signal as the wearable device.

20. The non-transitory computer-readable storage medium of claim 17, further comprising storing instructions that, when being executed by a processor of a terminal, cause the terminal to perform:
sending, in response to the granting of the control permission and detection of a touch input within a trigger range of the interface, an instruction to the smart home to control the smart home device.

* * * * *